United States Patent [19]

Aine

[11] Patent Number: 5,121,711

[45] Date of Patent: Jun. 16, 1992

[54] WIRELESS CONTROL OF ANIMALS

[76] Inventor: Harry E. Aine, 670 J. D. Broome Rd., Sumrall, Miss. 39482

[21] Appl. No.: 621,788

[22] Filed: Dec. 4, 1990

[51] Int. Cl.$^5$ .............................................. A01K 3/00
[52] U.S. Cl. ........................................ 119/29; 119/15; 340/573; 375/40; 455/101
[58] Field of Search .................. 119/15, 24, 29, 96; 340/573, 539; 455/101; 375/40

[56] References Cited

U.S. PATENT DOCUMENTS

| | | | |
|---|---|---|---|
| 3,897,753 | 8/1975 | Lee et al. | 119/51 R |
| 3,980,051 | 9/1976 | Fury | 119/29 |
| 4,304,193 | 12/1981 | Wadden | 119/29 |
| 4,461,240 | 7/1984 | Ostler | 119/51 R |
| 4,463,353 | 7/1984 | Kuzara | 340/825 |
| 4,490,830 | 12/1984 | Kai et al. | 375/40 |
| 4,617,876 | 10/1986 | Hayes | 119/155 |
| 4,651,678 | 3/1987 | Kime | 119/29 |
| 4,733,633 | 3/1988 | Yarnall, Sr. et al. | 119/29 |
| 4,745,882 | 5/1988 | Yarnall, Sr. et al. | 119/29 |
| 4,766,847 | 8/1988 | Venczel et al. | 119/29 |
| 4,898,120 | 2/1990 | Brose | 119/29 |

OTHER PUBLICATIONS

Weibye, C. Tuning in to livestock control, Hay & Forage grower, Nov. 1990, p. 4.

Primary Examiner—John G. Weiss
Attorney, Agent, or Firm—Harry E. Aine

[57] ABSTRACT

In one embodiment of a wireless method of animal control, using animal borne wireless receivers and warning devices, the animal is warned to remain within a lobe of the transmitter station. The lobe is readily moved to facilitate herding and rotational grazing. In another embodiment, the animal is warned not to cross a line (electronic fence) defined between a pair of overlapping lobes of the transmitter station. A third overlapping lobe of radiation provides an electronic gate in the electronic fence by disabling the animal warning device within the localized region of the third lobe. Alternately energizing the pair of overlapping lobes facilitates detection of the electronic fence.

8 Claims, 3 Drawing Sheets

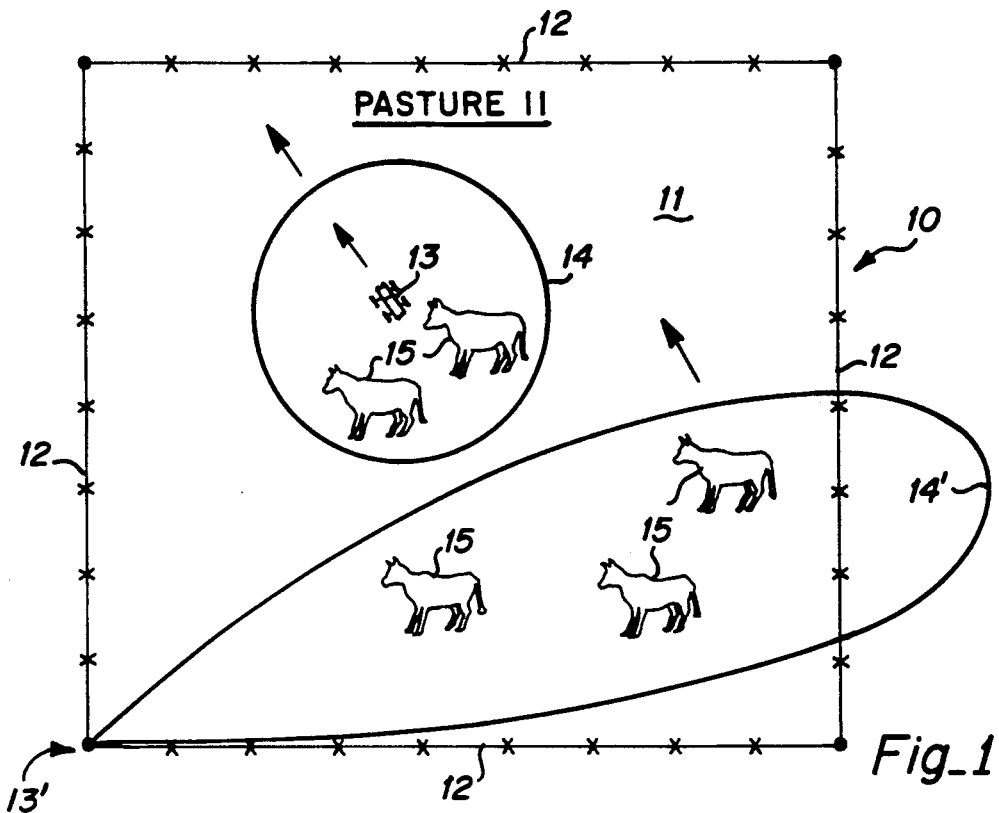
Fig_1
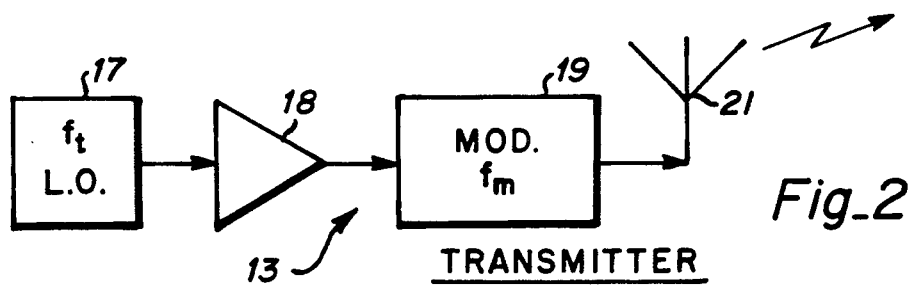
Fig_2
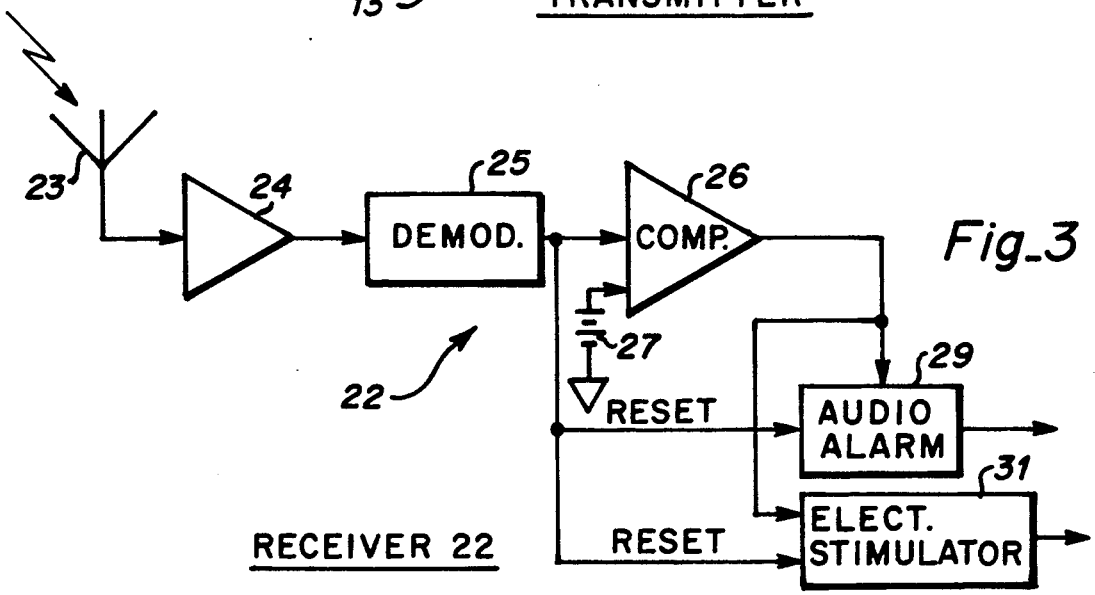
Fig_3

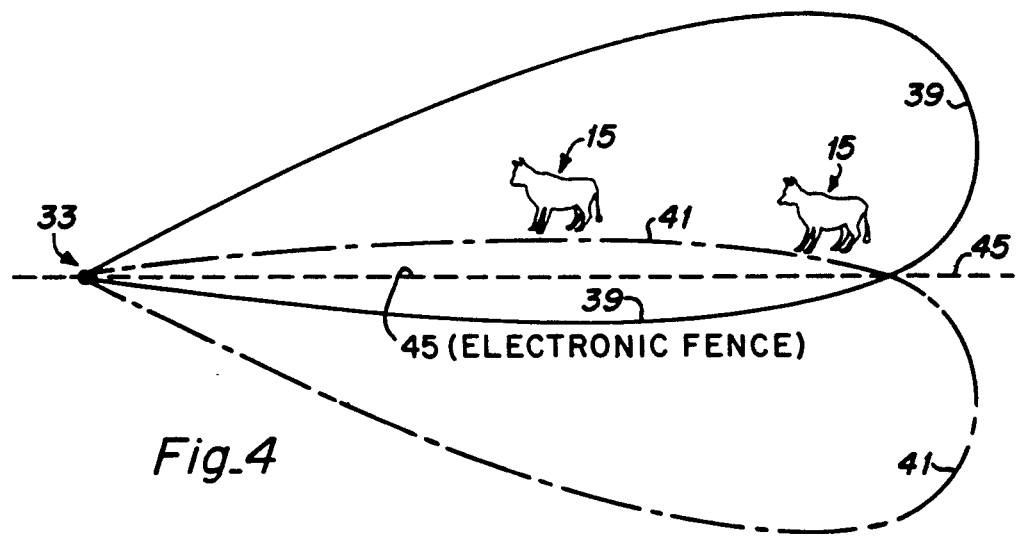
Fig_4
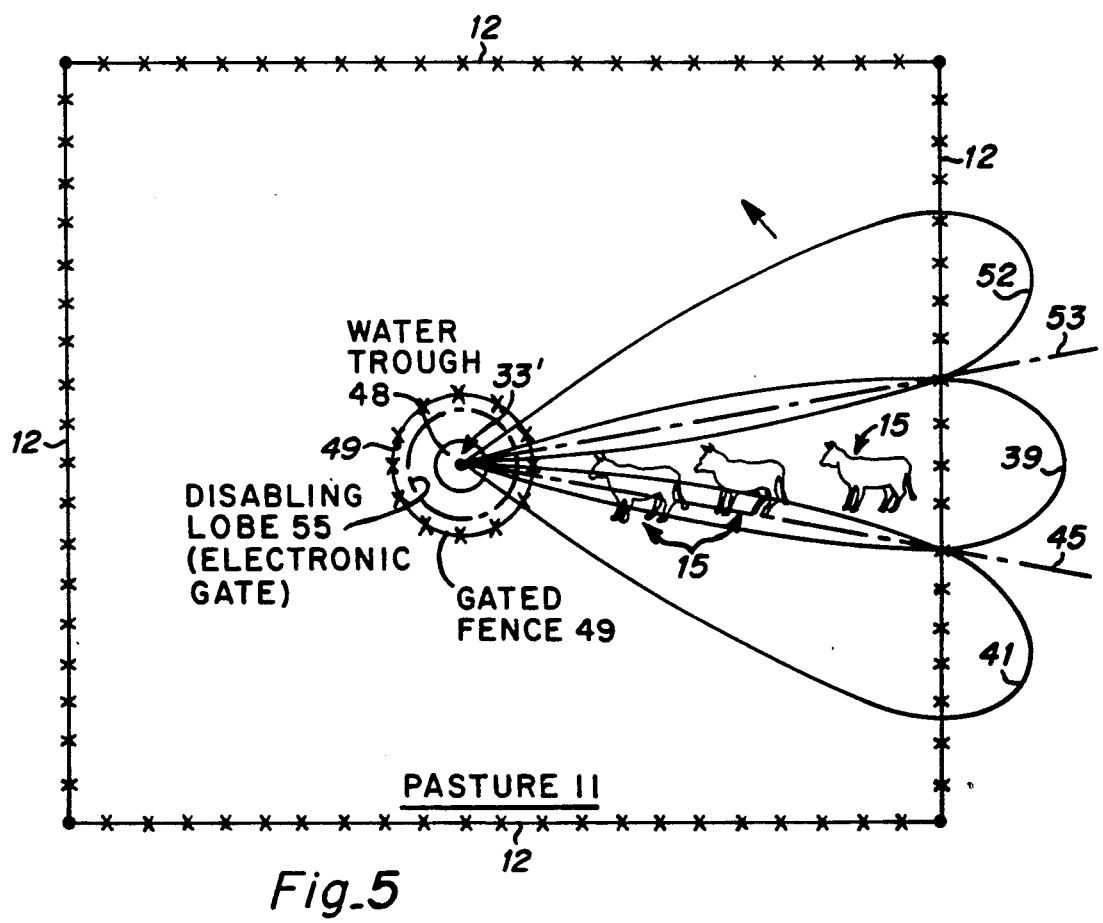
Fig_5

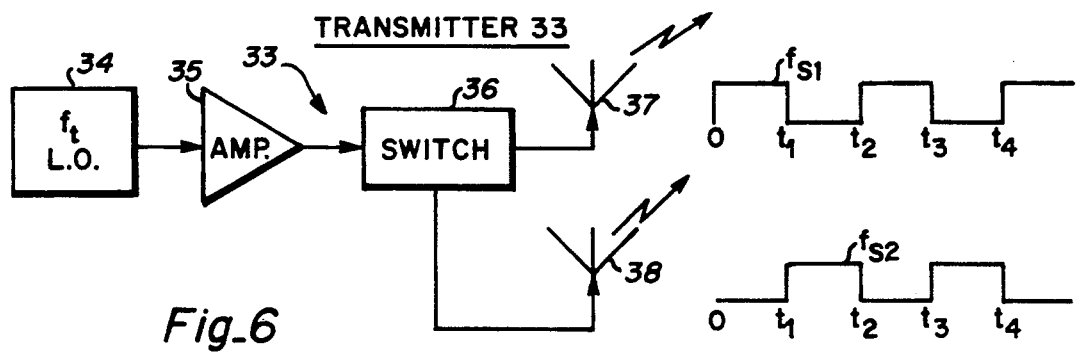
Fig_6
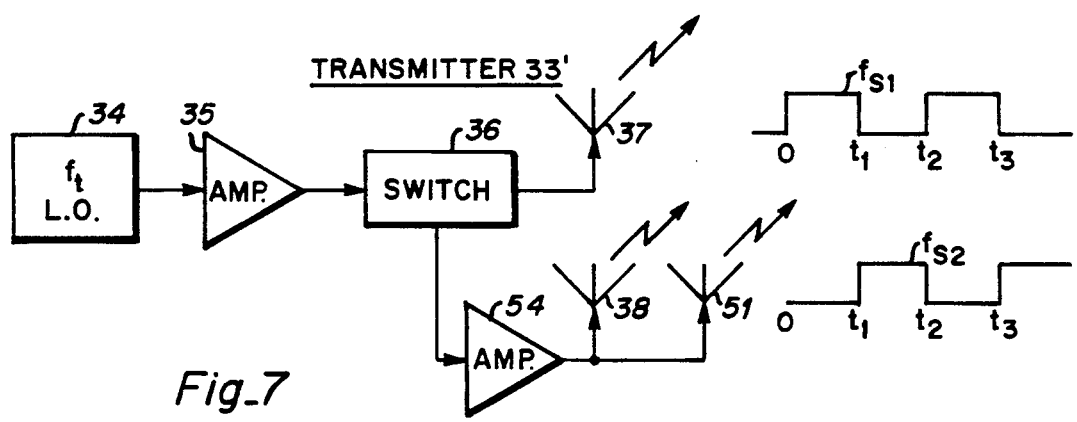
Fig_7
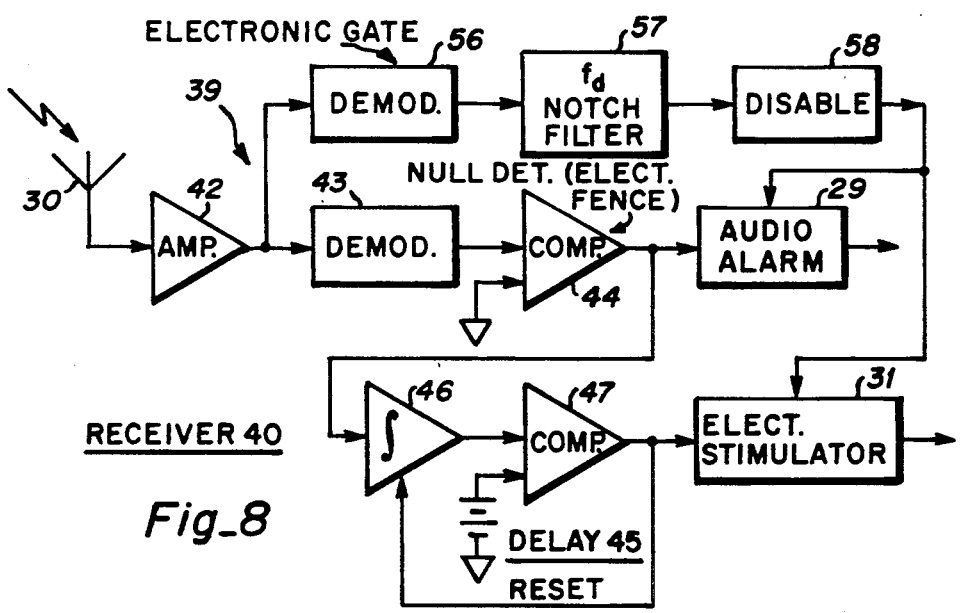
Fig_8

WIRELESS CONTROL OF ANIMALS

BACKGROUND OF THE INVENTION

The present invention relates in general to wireless control of animals and, more particularly, to such systems using one or more wireless transmitters with a receiver attached to the animal for administering control stimuli to the animal.

DESCRIPTION OF THE PRIOR ART

Heretofore, omnidirection wireless radio transmitters have been set out in regions to be protected from grazing by cattle. The cattle wore battery powered radio receivers attached to their ears or worn as a collar around their necks. Audio and electric stimuli were administered to the cattle in response to receiving a signal exceeding a certain threshold level.

More particularly, as an animal entered into the area of exclusion (lobe of the omnidirectional transmitter), its receiver picked up the transmitter's signal and buzzed a first warning. If the animal continued to move into that area, an electrical stimulus was applied. The stimulus repeated at periodic intervals until the animal left. However, as a safety precaution, the receiver stopped the electrical stimulus if it persisted for a predetermined length of time.

In trials, few cattle needed electrical stimulation beyond the first day. After wearing collars three days, the steers would graze near an exclusion area until the auditory warning was heard, then move away and continue grazing. No adverse affect on steer performance or gain was observed.

The aforementioned radio controlled grazing system is described in an article appearing in the November 1990 issue of Hay and Forage Grower, at page 4.

Some of the problems with the prior art omindirectional exclusion area system are that it is not well suited for defining linear exclusion areas nor is it suitable for enclosing animals in a manner similar to that provided by ordinary wire fencing. Also, the effective edge of the omnidirectional pattern is not well defined but depends on strength of the transmitted signal, orientation of the receiving antenna, local attenuation of the transmitted signal, and the threshold signal level of the receiver.

It would be desirable to provide a system using wireless transmitters that is readily portable, if desired, and would more nearly approxmimate results obtained by ordinary wire fencing.

SUMMARY OF THE INVENTION

The principal object of the present invention is the provision of an improved system for wireless control of animals and, more particularly, to such a system approximating the results obtained by ordinary wire fencing.

In one feature of the present invention, the receiver bearing animals are stimulated to remain within a lobe of radiation emanating from a transmitter, whereby control is facilitated.

In another feature of the present invention, a pair of over lapping spatially offset lobes of radiation are transmitted and the animal borne receivers detect when the strengths of the overlapping lobes have a certain predetermined ratio, such as equal strengths, to warn the animal, whereby the edge of the exclusion area is more clearly defined and/or linearized to provide an electronic fence line.

In another feature of the present invention, the pair of overlapping spatially offset lobes of radiation are alternately energized, whereby detection of the electronic fence is facilitated.

In another feature of the present invention, a third localized lobe of radiation overlaps a portion of the electronic fence to disable the animal warning stimuli, thereby forming an electronic gate in the electronic fence.

Other features and advantages of the present invention will become apparent upon a perusal of the following specification taken in connection with the accompanying drawings, wherein:

BRIEF DESCRIPTION OF THE DRAWINGS

FIG. 1 is a schematic plan view of a pasture depicting a wireless animal control system of the present invention, FIG. 2 is a schematic block diagram of a transmitter portion of the system of FIG. 1, FIG. 3 is a schematic block diagram of an animal borne receiver portion of the system of FIG. 1.

FIG. 4 is a plan view of two overlapping transmitter lobes depicting the edge defining and linearizing effect, FIG. 5 is schematic plan view of a pasture depicting an alternative wireless animal control embodiment of the present invention, FIG. 6 is a schematic block diagram of a transmitter portion of the system of FIGS. 4 and 5, FIG. 7 is a schematic block diagram of an alternative embodiment of the transmitter of FIG. 6, and FIG. 8 is a schematic block diagram of a receiver portion of the system of FIG. 5.

DESCRIPTION OF THE PREFERRED EMBODIMENTS OF THE INVENTION

Referring now to FIGS. 1-3 there is shown an animal control system 10 incorporating features of the present invention. A pasture 11 is enclosed by wire fencing 12. An omindirectional portable radio transmitter 13 (FIG. 2) emits a 360° circular lobe of radiation 14. Livestock 15, which are to be rotationally grazed, are herded into the lobe of radiation 14. The transmitter 13 includes a local oscillator 17 for generating a carrier signal $f_t$. The carrier signal $f_t$ is amplified in amplifier 18 and audio modulated in modulator 19 with an audio modulation signal $f_m$. The modulated carrier is transmitted by an omnidirectional antenna 21 to form the circular lobe 14 of radiation.

Radio receivers 22 (FIG. 3) are carried by the livestock 15. Each receiver 22 includes an omnidirectional receiving antenna 23 for receiving the transmitted radiation which is thence amplified in amplifier 24 and detected in demodulator 25 to recover the modulation signal $f_m$. The modulation signal is further amplified in the demodulator 25, rectified and filtered to produce a d.c. signal output proportional to the intensity of the received radiation.

The d.c. signal is thence fed to one input of a comparator 26 for comparison with a reference voltage derived from voltage source 27. When the received d.c. signal level falls below the reference level (threshold level) the comparator 26 outputs a signal to enable animal warning devices which include an audio alarm 29 and an electrical stimulator 31(shock device).

The electric stimulator 31 includes an internal time delay which serves to delay application of the electrical stimulus until after the audio alarm has been activated for a predetermined time sufficient for the animal to return to the lobe of radiation 14. Also, the audio alarm 29 and electrical stimulator 31 include timers that will disable the audio alarm 29 and electrical stimulator 31 if the animal fails to respond correctly and remains outside of the lobe 14 for too long a period. These timers are reset when the received signal strength exceeds the threshold level.

In operation, the livestock 15 are herded into the lobe of radiation 14. If an animal tends to stray out of the lobe 14 it is warned by the audio alarm 29. If the animal does not return to the lobe 14 within a specified time the electrical stimulator 31 administers an electrical stimulus.

Rotational grazing is obtained by moving the portable transmitter 13 to successive locations for control over the grazing pressure on the pasture, as is well known in rotational grazing practice. In addition, the ominidirectional lobe 14 is useful for leading the livestock 15 from one place to another, as the livestock 15 are constrained to follow the movement of the portable transmitter 13.

FIG. 1 also depicts an alternative transmitter embodiment wherein the transmitter 13' is located at the corner of the pasture 11 and radiates an elongated lobe 14' of radiation. As in the previous embodiment, the livestock 15 are constrained to remain within the lobe 14' and to follow movement of the lobe 14' as it is scanned across the pasture either by rotation or translation, to effect rotational grazing.

Referring now to FIGS. 4, 6 and 8 there is shown an alternative embodiment of the present invention wherein the boundary of a lobe of radiation is more clearly defined and linearized. More particularly, a transmitter station 33 (FIG. 6) includes a local oscillator 34 generating a carrier signal $f_t$ which is amplified in amplifier 35 and fed to switch 36 which switches the carrier signal, alternately, between a pair of directional antennas 37 and 38 having spatially off-set and overlapping lobes of radiation 39 and 41, respectively (FIG. 4). The switching function serves to audio modulate the carrier $f_t$ at the switching frequency $f_s$ to produce 180° out of phase audio modulation signals $f_{s1}$ and $f_{s2}$ on respective lobes 39 and 41.

Receivers 40 (FIG. 8), carried by the livestock animals 15, receive the transmitted signals $f_{s1}$ and $f_{s2}$ on omnidirectional receiving antennas 30. The received signals are amplified by amplifier 42 and thence demodulated by demodulator 43. The demodulated, rectified and smoothed d.c. output of the demodulator 43 is fed to one input of a comparator 44 serving as a null detector. The output of the demodulator 42 is a d.c. signal with an amplitude which is a function of the ratio of or difference in the amplitudes of the two received audio signals $f_{s1}$ and $f_{s2}$.

Thus, when the animal 15 is to one side of a line 45, (FIG. 4), i.e., in an area where audio signals from both lobes 39 and 41 are of unequal magnitude there will be a d.c. output from demodulator 43. However, when the animal closely approaches the line 45 (electronic fence), the d.c. output of demodulator 43 approaches zero amplitude. This low level null d.c. signal is detected in comparator 44 to give an output to nable the audio alarm 29 and electrical stimulator 31.

A delay circuit 45 delays the enabling input to the electrical stimulator 31. More particularly, the enabling output of the comparator 44 is fed to the input of an integrator 46 which integrates the enabling signal and feeds an integrated output to one input of a comparator 47, set as a threshold detector. When the threshold level is reached, the comparator 47 outputs an enabling signal to the electrical stimulator 31 and resets the integrator 46.

In operation, the system of FIGS. 4,6 and 8 operates similarly to an electric fence along a locus of points falling along line 45. The "fence" 45 is movable merely by rotating or translating the transmitter station 33. One desirable feature of the wireless control of FIG.4 is that the wireless fence line 45 is more clearly defined and is not so dependent upon signal strength and variations thereof as found with the system of FIG.1. Also, the fence line 45 is linearized for application where such a feature is desirable.

Referring now to FIGS. 5,7 and 8 there is shown an alternative system for wireless rotational grazing using features of the system of FIG. 4. A transmitter station 33' is located in the center of a pasture 11 enclosed by fence 12. A water trough 48 is also centrally located. A circular wire fence 49, with multiple gates, surrounds the transmitter 33' and water trough 48.

The transmitter station 33' (FIG.7) is similar to that of FIG. 6 with the exception that a third directional antenna 51 is employed for producing a third lobe 52 partially overlapping the side of the central lobe 39 on the side opposite lobe 41. This will produce a second electronic fence line 53 with the animals 15 enclosed in the sector defined between the electronic fence lines 45 and 53. An amplifier 54, in the input to the side lobe antennas 38 and 51, boosts the power to these antennas such that their transmitted powers are preferably each equal to the power transmitted by the central antenna 37.

An omnidirectional localizing transmitter 13, such as that of FIG. 2, is located at the central transmitter station 33' to produce an omnidirectional lobe 55 of disabling radiation. The radiated power is selected so that the edge of the circular disabling lobe 55 is just inside the circular gated fence 49.

The disabling radiation is modulated at a certain disabling audio frequency $f_d$ which is demodulated (FIG.8) in a demodulator 56 and fed through notch filter 57, centered on the disabling frequency $f_d$, to produce an output to a disabling circuit 58 which disables both the audio alarm 29 and the electrical stimulator 31 so long as the animal remains within the disabling lobe 55. In this manner an electronic gate is formed in the electronic fence 45 and 53 permitting the animal to enter the area of the water trough and circular gated fence 49.

Rotational grazing is obtained by rotating the lobes of radiation 41, 39 and 52 about the center of the pasture at the desired rate, i.e., one rotation every 3–4 weeks depending upon the rate of growth of the grass in the pasture.

As thus far described, the electrical circuits of FIG. 6,7 and 8 have been described primarily in analog form, for ease of explanation. However, it is well known in the art that various digital equivalents may be substituted for the analog devices, such as a microprocessor, digital filters, counters, ratio detectors, AND, OR and NOR gates. Moreover, the radiation need not be electromagetic but may be ultrasonic. Furthermore, the radiated electromagetic fields are defined herein to include the near field of the antennas.

What is claimed is:

1. In a method for wireless control of animals, the steps of:

generating a pair of overlapping spatially displaced lobes of radiation signals;

receiving the radiation from the pair of overlapping lobes with a receiver borne by the animal to be controlled to derive an output which is a function of the relative amplitude of the received radiation signals from the pair of lobes; and enabling an animal warning device borne by the animal in response to the derived output when the relative amplitude of the received radiation signals fall within a certain predetermined value, whereby the animal is controlled to be excluded from that region wherein the relative amplitude of the received radiation signals falls within the certain pre-determined value.

2. The method of claim 1 wherein the certain predetermined value generally correspond to when the amplitudes of the received radiation signals are equal.

3. The method of claim 1 including the step of:
alternately energizing first one and then the other of said generated pair of overlapping spatially displaced lobes of radiation.

4. The method of claim 1 including:
generating a third lobe of radiation overlapping a portion of said pair of lobes;
receiving the radiation from said third lobe with a receiver borne by the animal to be controlled to derive a disabling output; and
disabling said animal warning device in response to said disabling output, whereby the animal is controlled to pass through said pair of overlapping lobes in the region of said third lobe.

5. In an apparatus for wireless control of animals:
receiver means to be borne by the animal to be controlled for receiving radiation from a pair of spatially displaced overlapping lobes of radiation signals to derive a relative amplitude output which is a function of the relative amplitude of the received radiation signals from the pair of lobes; and animal warning means to be borne by the animal and responsive to said relative amplitude output for warning the animal when the relative amplitude of the received radiation signals fall within a certain predetermined value, whereby the animal is controlled to be excluded from that exclusion region wherein the relative amplitude of the received radiation signals falls within the certain predetermined value.

6. The apparatus of claim 5 wherein the predetermined value of the relative amplitude of the received radiation signals corresponds to when the amplitudes of the received radiation signals from the pair of lobes are generally equal.

7. The apparatus of claim 5 including:
auxillary receiver means to be borne by the animal to be controlled for receiving radiation from a third spatially overlapping lobe of radiation to derive a disabling output; and
disabling means responsive to said disabling output for disabling said animal warning device, whereby the animal is controlled to pass through said exclusion region defined by said pair of overlapping lobes in the region of said third lobe.

8. In an apparatus for wireless control of animals of the type wherein a wireless receiver, borne by the animal, receives signals transmitted from a transmitter to derive a control signal for controlling actions of the animal, the improvement comprising:
transmitter means for generating a pair of overlapping spatially displaced lobes of radiation; and
energizing means for alternately energizing first open and then the other of said generated pair of overlapping spatially displaced lobes of radiation to drive the signal received by the animal being controlled.

* * * * *